United States Patent
Flohr et al.

(10) Patent No.: US 10,287,997 B2
(45) Date of Patent: May 14, 2019

(54) METHOD AND DEVICE FOR OPERATING A DUAL-FUEL INTERNAL COMBUSTION ENGINE

(71) Applicant: MTU Friedrichshafen GmbH, Friedrichshafen (DE)

(72) Inventors: Andreas Flohr, Manzell (DE); Andreas Geller, Ulm (DE)

(73) Assignee: MTU FRIEDRICHSHAFEN GMBH, Friedrichshafen (DE)

(*) Notice: Subject to any disclaimer, the term of this patent is extended or adjusted under 35 U.S.C. 154(b) by 806 days.

(21) Appl. No.: 14/780,960

(22) PCT Filed: Jan. 20, 2014

(86) PCT No.: PCT/EP2014/000141
§ 371 (c)(1),
(2) Date: Sep. 28, 2015

(87) PCT Pub. No.: WO2014/154313
PCT Pub. Date: Oct. 2, 2014

(65) Prior Publication Data
US 2016/0040609 A1    Feb. 11, 2016

(30) Foreign Application Priority Data

Mar. 28, 2013 (DE) .................. 10 2013 205 719

(51) Int. Cl.
*F02D 19/06* (2006.01)
*F02D 41/00* (2006.01)
(Continued)

(52) U.S. Cl.
CPC ............ *F02D 19/0615* (2013.01); *F02B 3/06* (2013.01); *F02D 19/06* (2013.01);
(Continued)

(58) Field of Classification Search
CPC .. F02D 19/06; F02D 19/0615; F02D 19/0613; F02D 19/0642; F02D 19/105;
(Continued)

(56) References Cited

U.S. PATENT DOCUMENTS 5,996,558 A    12/1999  Ouellette et al.
6,101,986 A *   8/2000  Brown ................ F02D 19/0628
                                                123/27 GE
(Continued)

FOREIGN PATENT DOCUMENTS

CN    101535615 A    9/2009
CN    102918237 A    2/2013
(Continued)

*Primary Examiner* — Grant Moubry
(74) *Attorney, Agent, or Firm* — Lucas & Mercanti, LLP; Klaus P. Stoffel

(57) ABSTRACT

A method for operating a dual-fuel internal combustion engine, having an intake path and an engine having a number of cylinders. In the method the engine is operated in a first operating state in diesel operation with diesel or another liquid fuel, and in a second operating state in gas operation with gas as fuel in a charge mixture, and switching between diesel operation and gas operation takes place in a switchover range determined, in particular predetermined, by switchover operating parameters.

23 Claims, 7 Drawing Sheets

(51) Int. Cl.
*F02B 3/06* (2006.01)
*F02D 41/30* (2006.01)
*F02D 19/10* (2006.01)

(52) U.S. Cl.
CPC ..... *F02D 19/0613* (2013.01); *F02D 19/0642* (2013.01); *F02D 19/105* (2013.01); *F02D 41/008* (2013.01); *F02D 41/0025* (2013.01); *F02D 41/3094* (2013.01); *F02D 2200/0406* (2013.01); *Y02T 10/36* (2013.01)

(58) Field of Classification Search
CPC ............. F02D 41/3094; F02D 41/0025; F02D 41/008; F02D 2200/0406; F02B 3/06; F02B 3/08
See application file for complete search history.

(56) References Cited

U.S. PATENT DOCUMENTS

| | | | |
|---|---|---|---|
| 6,131,552 A | 10/2000 | Paielli et al. | |
| 6,250,260 B1 | 6/2001 | Green | |
| 6,289,871 B1 | 9/2001 | Brown et al. | |
| 6,814,032 B2 * | 11/2004 | Goto | F02B 19/10 123/27 GE |
| 7,093,588 B2 * | 8/2006 | Edwards | F02D 19/0631 123/525 |
| 8,220,439 B2 | 7/2012 | Fisher | |
| 8,412,439 B2 | 4/2013 | Warner et al. | |
| 2003/0187565 A1 * | 10/2003 | Wong | F02D 19/027 701/103 |
| 2004/0111210 A1 * | 6/2004 | Davis | F02D 19/027 701/103 |
| 2011/0257869 A1 * | 10/2011 | Kumar | B61L 3/006 701/103 |
| 2013/0220274 A1 | 8/2013 | Deshpande et al. | |

FOREIGN PATENT DOCUMENTS

| | | |
|---|---|---|
| DE | 69812926 T2 | 3/2004 |
| EP | 1398490 A2 | 3/2004 |
| EP | 1988272 A1 | 11/2008 |
| EP | 2069627 B1 | 6/2009 |
| GB | 2402754 A | 12/2004 |
| RU | 2439352 C2 | 1/2012 |
| RU | 2468231 C2 | 11/2012 |
| SU | 1768786 | 10/1992 |
| WO | 9945256 A1 | 9/1999 |
| WO | 2011153069 A1 | 12/2011 |

* cited by examiner

METHOD AND DEVICE FOR OPERATING A DUAL-FUEL INTERNAL COMBUSTION ENGINE

The present application is a 371 of International application PCT/EP2014/000141, filed Jan. 20, 2014, which claims priority of DE 10 2013 205 719.9, filed Mar. 28, 2013, the priority of these applications is hereby claimed and these applications are incorporated herein by reference.

BACKGROUND OF THE INVENTION

The invention relates to a method for operating a dual-fuel internal combustion engine having a gas mixer, an intake path and an engine having a number of cylinders and having an injection system, wherein the dual-fuel internal combustion engine is operated, in a first operating state, in diesel operation with diesel and, in a second operating state, in gas operation with gas as fuel. The invention further relates to a control system for the dual-fuel internal combustion engine as and a dual-fuel internal combustion engine. The dual-fuel internal combustion engine further has, preferably but not necessarily, in the intake path, a forced-induction unit and a bypass path for bypassing the forced-induction unit.

This type of dual-fuel internal combustion engine is also termed a multi-fuel internal combustion engine and can also be operated with, in addition to the preferred fuel choice of diesel and gas, a great many other fuels. Usually, a dual-fuel internal combustion engine is operated with one or the other fuel depending on fuel availability.

In particular in the case of gas operation (in certain cases also additionally or alternatively in diesel operation) a dual-fuel internal combustion engine can be operated in ignition jet operation in accordance with the diesel process with external mixing of a gas-air mixture and preferably a diesel ignition jet. Thus, engines of the dual-fuel internal combustion engine are generally constructed on the basis of a diesel engine construction and are amongst the newest technologies, in particular in the field of environmentally friendly application possibilities for large engines. The type of internal combustion engine mentioned in the introduction can in particular also comprise what is termed a high-pressure gas engine with internal mixing, which can deliver, by means of gas injection in ranges of greater than 200 bar in conjunction with a diesel ignition jet, a relatively high specific cylinder power. The ignition jet engine can also be operated with liquid fuel such as diesel or another liquefied fuel such as liquefied natural gas (LNG) or also liquefied petroleum gas (LPG). A dual-fuel internal combustion engine can thus preferably have a gas-diesel engine to form a gas-diesel internal combustion engine.

It is however also possible in principle to provide central mixing for gas operation, for example by means of a gas mixer. Within the context of the present application, reference is made primarily to gas operation in which mixing takes place individually cylinder by cylinder, preferably immediately upstream of the cylinder. Each cylinder may be assigned a separate gas injection valve which is actuated individually cylinder by cylinder. In particular, actuation can take place depending on the operating cycle of a bank of cylinders. Preferably, an ignition jet of liquid fuel can serve for igniting the combustion gas mixture in the cylinder; it is also possible in principle for spark-ignited gas operation to be provided.

Thus, a dual-fuel internal combustion engine can preferably have an injection system which can preferably be controlled electronically and is suitable for various grades of gas, such as biogas or petroleum gas, in liquid form or also for the use of oils such as vegetable oils or the like as liquid fuel. Common rail injection systems but in certain cases also pump-nozzle injection systems with electronic control have proven to be of great use in this context. As mentioned, in gas operation the ignition medium can be added at high pressure to the gaseous fuel proper of the charge mixture or can also be added to the intake duct. Dual-fuel engines operating in gas operation, in particular ignition jet operation, in accordance with the diesel process with external mixing (i.e. mixing outside the cylinder) are overall more flexible in the use of fuel and produce lower emissions. Fields of application are mobile applications, such as marine engines or utility vehicles and heavy goods vehicles, and also static applications such as local power plants which are in particular advantageously to be configured for a variable gas supply. There arises the preferred possibility, not least because of comparatively constant fuel quality, to operate the dual-fuel internal combustion engine either with gas or with liquid fuel such as diesel or liquefied gas.

For example, EP 2 069 627 B1 discloses a dual-fuel internal combustion engine of the general type with a proportioning system for matching a flow of liquefied gas and diesel, wherein excess fuel mixtures are collected and are returned to a mixing chamber for subsequent combustion in a combustion chamber of the engine.

U.S. Pat. No. 6,131,552 discloses, overall, a fuel control system which can regulate the supply of gas to a mixing chamber as a function of a measured operating state of the engine.

Customarily, air consumption is a measure of the gaseous fresh charge of charge air supplied to a combustion engine in a charge mixture, wherein the air consumption also permits monitoring of the quality of the intake system and intake process. The actual air consumption generally represents the ratio of the mass of fresh air in a charge mixture actually supplied to the engine or to a cylinder thereof, during an operating cycle. This real mixture mass is compared to the theoretical fresh charge mass, determined from the geometric displacement volume and the theoretical charge density under atmospheric conditions (in the case of naturally aspirated engines) or, in the case of forced-induction engines, in this case the state of the fresh charge downstream of the compressor or downstream of the charge air cooler is taken into account.

Fresh charge supplied to a cylinder is affected by a number of factors such as the valve control times or the opening cross section of the valves. This can in principle be determined by a module for determining the engine forced induction, which is supported by an intake path model. In actual fact, however, only in exceptional cases does the fresh charge supplied to the engine in a charge mixture correspond to the theoretical. Air consumption is not a constant value for an engine, but is greatly dependent on the engine speed and the actual geometric ratios of the intake tract and the combustion space; in order to overcome this dependency it is possible to refer for example to a suitable characteristic map.

However, intake path models are in principle known in engine controllers only in the context of general internal combustion engines, such as in EP 1 398 490 A2. Common to these is the widely adopted fundamental concept for modeling the intake path—in the simplest case as a homogeneous pressurized container and in order to detect the dynamic processes in the air path—by modeling the storage behavior of the intake path, also termed suction tube, by means of the filling and emptying methods. In that context, the suction tube is treated as a pressurized container which is continuously filled with air via a throttle flap and out of which the engine sucks air via the inlet valve by means of its suction behavior corresponding to the working rhythm.

In the operation of gas engines, the mixture can as mentioned be formed upstream of the compressor of the exhaust-gas turbocharging and/or also individually cylinder by cylinder upstream of a cylinder. At the same time, the intake path between the compressor outlet and the combustion space inlet consists of partially large volumes which can thus store or discharge significant masses of charge fluid, i.e. in particular masses of mixture or also only masses of charge air. This is in particular the case when, in the event of changes in load on the engine and/or in engine speed, there arise in the individual partial volumes changes in pressure and/or in temperature.

Independently of the manner in which the mixture is formed, it is clear that the fuel supply of a dual-fuel internal combustion engine, in particular in the transient operating range of the internal combustion engine and in the case of variable fuel qualities, and/or a reliable indication of state parameters of a charge fluid in the intake path, is extremely complex. In particular, it is found that operation in the low-load range can be problematic in the case of dual-fuel internal combustion engines, in particular for designing an ignition jet engine.

The above-mentioned control method of U.S. Pat. No. 6,131,552 A proves insufficient for solving the problem, even in the case of complex control systems. This is also the case for other load-dependent gas metering systems or other fuel metering systems in complex control systems; in particular if in addition, especially in the low-load range, hydrocarbon emissions (HC emissions) should be kept as low as possible. It is desirable to provide a more advantageous dual-fuel operation of an internal combustion engine in particular in the transient, preferably low-load range, in accordance with the load requirements and also the emissions requirements.

SUMMARY OF THE INVENTION

This is the starting point of the invention, the object of which is to specify a method and a device by means of which improved operation of an internal combustion engine as a dual-fuel internal combustion engine is achieved, in particular for a low-load range. In particular, the invention has the object of achieving an improvement in transient operation and/or an improvement in terms of emissions, in particular while increasing a load in the low-load range or from zero-load. Preferably, an existing problem of a fuel composition in the low-load range is to be solved in an improved manner, in particular avoiding jumps in the torque of an engine in continued transient operation. In particular, a transition between diesel operation and gas operation, preferably from diesel operation to gas operation, is to be made available. The invention also has the object of addressing at least one of the above-described problems. At least, an alternative solution is to be proposed.

In that context, proceeding from a method of the type mentioned in the introduction, it is provided that the engine is operated in a first operating state in diesel operation with diesel or another liquid fuel and in a second operating state in gas operation with gas (BG) as fuel in a charge mixture. It is provided according to the invention that switching between diesel operation and gas operation takes place in a switchover range determined, in particular predetermined, by means of switchover operating parameters.

In particular, a predetermined switchover range can be established by means of predetermined values of a switchover operating parameter, i.e. a switchover value for an operating parameter of the internal combustion engine. Preferably, a predetermined value of a switchover operating parameter can be a SETPOINT value or ACTUAL value or a virtual value. In particular, it can be a switchover point; that is to say exactly one value of the switchover operating parameter or parameters.

The invention thus establishes the basis for a particularly advantageous increase in load in the case of a gas engine, in particular in the case of an ignition jet gas engine, from zero load or the low-load range.

The invention proceeds from the consideration that, for an increase in load from zero load or the low-load range, in the case of a gas engine, in particular in the case of an ignition jet gas engine, there are several fundamental challenges which can however be solved in a considered manner with the concept of the invention.

First, the invention proceeds from the consideration that at low engine loads it would be necessary to run very low (intake air) pressures upstream of a cylinder as long as the setpoint (gas-) combustion air ratio is not to exceed a determined value (e.g. 2 . . . 2.5), in order to achieve an improvement in terms of emissions. However, at these low pressures reliable ignition in gas operation, in particular of an injected ignition jet, is ensured only to a limited extent or not at all.

In addition, the invention proceeds from the consideration that without throttling of the intake air at low engine loads in gas operation, in particular in ignition-jet operation, it is necessary to run very high (gas-) combustion air ratios, at which it is then indeed possible to achieve reliable ignition, in particular reliable ignition with an ignition jet, but the gas as fuel in a charge mixture would no longer combust completely, which would thus give rise to high HC emissions.

This would also be the case for example in the procedure for increasing load, at approximately constant diesel injection quantity in zero-load engine operation, by increasingly metering gas into the combustion air. In other words, if, proceeding from your diesel operation, little combustion gas is at first supplied and if, in the case that a gas-air mixture is too lean, this can lead to extinction of a flame in the combustion space before the combustion gas has been converted in gas operation. As a consequence of a suitable mixture mass formation, however dictated only by the operating point, in the case of a dual-fuel internal combustion engine, high hydrocarbon emissions (HC emissions) or other raised emissions (NOx, CO, particulates, etc.) as well as low efficiencies are to be expected as a consequence of un-combusted combustion gas. Recirculation of un-combusted fuel, as in EP 2 069 627 B1, cannot solve this problem.

Since the above-mentioned procedures can thus not be achieved advantageously, or are not very helpful, it is necessary as recognized in the invention to run the lower-load operating ranges—in any case under increasing load and if in addition emissions ranges are to be observed in an improved manner—in ignition jet operation only as necessary or not at all.

Accordingly, in particular for increasing load in the case of low engine loads, the invention provides for undertaking an increase in the quantity of diesel injected in pure diesel operation. Then, the above-described problems do not arise. This results in the object of effecting a transition from a high load in pure diesel operation to as far as possible the same load in ignition jet operation, in particular without a jump in torque or similar discontinuous operating modes arising. More generally, it is found that, in particular during startup or another transient operating range, the switch from pure diesel operation to gas operation, i.e. in this case in particular ignition jet operation, can be problematic. There can arise jumps in torque if the switch from gas fuel to liquid fuel, in particular diesel fuel, or vice versa, is not properly matched to the loads and other operating requirements of the engine.

The concept of the invention advantageously uses the transition between diesel operation and gas operation, in particular in a range of low engine loads. According to the invention, switching between diesel operation (DB) and gas operation (ZB) takes place in a switchover range determined, in particular predetermined, by means of switchover operating parameters. In particular, switchover refers to that from diesel operation to ignition-jet operation and vice versa in the case of an ignition jet gas engine. In particular, the concept forms the basis that the transition is smooth and can be achieved preferably even in the case of changing load requirements and as far as possible avoiding excessive emissions.

Within the context of a particularly preferred refinement, the switchability is effected individually cylinder by cylinder both diesel (ignition jet) injection and gas metering. In particular for gas metering individually cylinder by cylinder, an intake path model (as in the conventional gas engine with mixing upstream of the compressor) proves to be less necessary; although this can be of advantage for reliably indicating state parameters of a charge fluid in the intake path.

The object relating to the device is achieved with the invention by a control system for a dual-fuel internal combustion engine.

The concept of the invention also leads, for achieving the object relating to the device, to a dual-fuel internal combustion engine. In particular, an internal combustion engine can have an intake path and an engine with a number of cylinders. In particular, as long as no gas mixing individually cylinder by cylinder is provided, the intake path could have a gas mixer. For diesel operation and/or for providing an ignition jet, an injection system which is advantageously designed as a common rail injection system has proven to be particularly advantageous.

Furthermore, the internal combustion engine preferably has a forced-induction unit with an intercooler and with a bypass path for bypassing the forced-induction unit, wherein the forced-induction unit has a compressor. In particular, it is further possible for a bypass path of the intake path to be provided as part of an intake system, for bypassing the forced-induction unit. Depending on the dimensions of the dual-fuel internal combustion engine, in particular on the basis of a large diesel engine, it is possible to provide a one- or two-stage forced-induction unit, preferably with exhaust-gas recirculation. Accordingly, the compressor can be configured as a one- or two-stage compressor, in particular in the manner of a turbocharger.

These and other advantageous refinements of the invention indicate in detail advantageous possibilities for embodying the concept of the invention within the scope of the refinements and with indication of further advantages.

One advantageous refinement proceeds from the consideration that advantageous transient operation of a dual-fuel internal combustion machine, in particular when switching between gas operation and diesel operation, should take place as far as possible taking into account a state pressure of the charge mixture in the intake path, in particular taking into account a throttling of the charge mixture, that is to say the charge air or the fuel mixture. The refinement has recognized that it can be expedient to that end to predefine a switchover operating parameter, at least in the form of a state pressure of the charge mixture in the intake path. The refinement has also recognized that it is in principle possible to fix, in particular to predefine, the switchover range by means of a state pressure of the charge mixture in the intake path, in particular of a receiver pressure immediately upstream of a cylinder of the engine. It has been found that switching between the operating modes, i.e. switching between gas operation and diesel operation or, in general, between gas operation and liquid operation of the dual-fuel internal combustion engine, takes place according to the concept of the refinement as a function of the state pressure of the charge mixture in the intake path, in particular of the charge pressure and/or of the receiver pressure.

Within the scope of one preferred refinement, it is further provided that at least one of the switchover operating parameters is a state pressure of the charge mixture in the intake path upstream of a cylinder of the engine, in particular a SETPOINT value of a state pressure of the charge mixture. It can also be possible to use an ACTUAL value of a state pressure of the charge mixture. It can also be possible to use an averaged ACTUAL or SETPOINT value. In certain cases it can also prove appropriate to use a virtual value of a state pressure of the charge mixture. In one particularly preferred refinement, the value of the state pressure can be a minimum value of the state pressure in a certain time period or can be determined otherwise.

It has proven particularly advantageous to design a switchover range as a function of a state pressure upstream of a cylinder of the engine, in particular as a function of a charge pressure ($p3$ in the drawing) and/or as a function of a receiver pressure ($p5$ in the drawing), in particular corresponding to a SETPOINT value thereof. It has proven particularly advantageous to design a switchover range as a function of a state pressure immediately upstream of a cylinder of the engine, in particular as a function of a receiver pressure, in particular a SETPOINT value of the receiver pressure, in particular a minimum value of the receiver pressure.

It can also prove to be appropriate that the state pressure or other switchover operating parameters are determined virtually, for example simulated and/or calculated, in particular in real-time and/or simultaneously for a first and a second operating state. Within the scope of a particularly preferred first variant of a refinement, it has proven advantageous for the first operating state to be diesel operation with diesel. Within the scope of a particularly preferred second variant of a refinement, the second operating state can be gas operation with gas as fuel, in particular in ignition jet operation. Advantageously, in diesel operation—according to one preferred refinement therefore primarily at low loads—already one pressure or other operating parameter calculation, in particular a SETPOINT pressure calculation for a state pressure upstream of a cylinder during ignition jet operation, should run in parallel with a pressure or other operating parameter calculation in diesel operation. It is thus advantageously possible to achieve that the switchover from diesel operation to ignition jet operation or other gas operation takes place when the (SETPOINT) pressure necessary for ignition jet operation has reached the (ACTUAL) pressure (in particular without throttling of the intake air in diesel operation) or a pressure predefined as a minimum pressure (in particular with throttling in diesel operation). The reverse can hold in analogous fashion.

In addition, it has proven to be advantageous, for determining a switchover operating parameter, in the form of a state pressure of the intake path, to provide throttles, and in particular actuators therefore, for influencing the state pressure such as a throttle flap, a throttle valve or other throttle members. In the present case, a throttle member for the intake path is considered to be any pressure-reducing means, this can include, where appropriate, in addition to an engine throttle, also a compressor bypass throttle. In particular, an engine throttle can also be a valve, a flap or a throttle or also a variable turbine geometry of a compressor. A setting angle α between an entirely open and an entirely closed setting is here used in general to describe a throttle setting; it is also possible for multiple throttle members of the above-mentioned type to be used in combination. In particular, an engine throttle can be provided upstream of the receiver volume and/or a compressor bypass throttle can be provided in the bypass path. It is possible, in particular depending on a SETPOINT and/or ACTUAL state pressure of the intake path, to undertake throttling of the intake path, in particular for throttling the engine and/or the bypass path.

Optional throttling in diesel operation would advantageously take place only upon reaching the minimum pressure, in order to have no long-term consumption drawbacks in diesel operation, since throttling generally also has, as a consequence, some form of consumption drawback. The chief objective of the optional throttling would then be in particular to extend the operating characteristic map range in which ignition-jet operation would be possible. In addition, it has been shown that in particular throttling in diesel operation prior to a switchover procedure can lead to a comparatively smooth switchover procedure without a jump in torque and/or with reduced HC emissions. To that end, a throttle member, in particular of the above-mentioned type, is moved according to one refinement in the direction of the closed setting in diesel operation, which prior to a switchover procedure leads to a reduction in the state pressure, in particular when the intended switchover is from diesel operation to ignition-jet operation. Reducing the receiver pressure and/or the charge pressure has proven successful in this regard. In general, the throttling in diesel operation can also be restricted only to the switchover procedure for switching to gas operation. It is in principle also possible to use a reduction of a compression pressure (p2 in the drawing) downstream of the compressor and/or of an intake pressure (p1 in the drawing) upstream of the compressor. After the switchover procedure, preferably from diesel operation to ignition-jet operation, the throttle member advantageously takes on part of the load regulation of the engine, for example the throttle member can be opened further after the switchover procedure.

Within the scope of a further particularly preferred refinement, it has proven to be advantageous that a first switchover point from diesel operation to gas operation is a different value than a second switchover point from gas operation to diesel operation. In other words, it is possible, according to the concept, to define a hysteresis for the switchover range by means of the switchover point, in particular defining two state pressures. This leads to a comparatively smooth switchover capacity of the dual-fuel internal combustion engine, in which the prevention of jumps in torque is improved. Furthermore, it has in particular proven advantageous to provide a switchover procedure between diesel operation (DB) and injection-jet operation (ZS) (in general gas operation (ZB)) with hysteresis.

Advantageously, the first switchover point from diesel operation to gas operation is at a higher value above a value for the second switchover point from gas operation to diesel operation. It has proven advantageous in principle to perform a first switchover point from diesel operation to gas operation with throttled engine, in particular by means of an engine throttle, and/or with throttled intake path, in particular by means of a compressor bypass throttle and/or intake throttle. To that end, an engine throttle arranged immediately upstream of the receiver volume can preferably be moved in the direction of a closed setting prior to the switchover.

In particular, different switchover points can be predefined as limits of the switchover range, at least by determining the state pressure of the intake path for the switchover. It has proven advantageous that, in order to plot a switchover hysteresis, the pressure upstream of a cylinder for switching back from ignition-jet operation (ZB) to diesel operation (DB) should be lower than is the case for the reverse switchover. In other words, it is possible, for switching from diesel operation to ignition jet operation, to predefine a higher state pressure of the intake path than for switching from ignition-jet operation (ZS) (generally gas operation (ZB)) to diesel operation (DB).

Within the scope of a particularly preferred concrete embodiment of this refinement, it has proven advantageous that a switchover operating parameter of a state pressure of the intake path is switched under the condition that the state pressure of diesel operation is equal to or greater than the state pressure, in particular the SETPOINT state pressure, of gas operation. Preferably, an advantageous condition lies in the fact that a virtually determined value and/or ACTUAL value of the state pressure in diesel operation is equal to or greater than a virtually determined and/or SETPOINT value of the state pressure of gas operation.

In particular, switching operating mode advantageously takes place, for transition from diesel operation to ignition jet operation, when the pressure upstream of a cylinder rises above a setpoint value, or, for transition from ignition jet operation to diesel operation, when the pressure upstream of a cylinder drops below a setpoint value. Advantageously, it is possible to shift the switchover thresholds, for switching to ignition jet operation, to lower loads by means of an at least short-term throttling of the pressure upstream of a cylinder in diesel operation. Switching the operating mode from diesel operation to ignition jet operation takes place in particular when the setpoint pressure for the ignition-jet operation corresponds to the actual charge air pressure upstream of a cylinder.

In all, individual measures of that type, alone or in combination, lead to switching of the operating mode without a noteworthy jump in torque. This has shown, advantageously, that it is thus possible to relatively effectively avoid jumps in torque. It has in particular been shown that, by means of these or similar conditions, the dual-fuel internal combustion machine can be controlled and/or regulated from a throttled ACTUAL state of diesel operation to a target SETPOINT state of gas operation; in particular additionally on account of the condition, formulated according to this refinement, for a switchover range. In principle, predefining a limit value for a difference between ACTUAL value and SETPOINT value of a state pressure makes it possible to define a hysteresis for the switchover range, preferably depending on the switchover direction for ignition jet operation when switching to ignition jet operation, or for diesel operation when switching to diesel operation.

Within the scope of a particularly preferred refinement, it has proven advantageous to assign, to the number of cylinders, a receiver volume upstream of the cylinders, which receiver volume can for example primarily consider the volume of a manifold or mixing path or the like downstream of an engine throttle.

It has in particular proven advantageous to provide the dual-fuel internal combustion engine with a forced-induction unit in the intake path of an intake system, in particular a forced-induction unit comprising an intercooler. Within the scope of a particularly preferred refinement, it has proven advantageous to assign, to the intercooler in the intake path, a heat exchanger volume which can for example primarily consider the volume of the intercooler or further volumes of the intake path upstream of an engine throttle.

Particularly advantageously, the state pressure is determined upstream of a cylinder of the engine, preferably as a receiver pressure in a receiver volume. A receiver volume is to be understood, in general, as any type of volume arranged upstream of the cylinder and downstream of a forced-induction unit and/or of a bypass path, in particular of an engine throttle. For example, a receiver volume can be the volume of a manifold or another widening of the construction space of the forced-induction path. In particular, a receiver volume is to be understood as a volume beyond the usual volumes of a forced-induction path; it can be seen within the scope of the refinement that predefining the receiver pressure in the receiver volume is particularly significant for the reliable control of the dual-fuel internal combustion engine, since increasing size of a receiver volume is linked with increasing uncertainty in the state of the combustion gas mixture. Controlling the receiver pressure in the receiver volume thus avoids imponderables which exist in the case of static assumptions relating to a forced-induction path.

It has proven advantageous that each cylinder of the engine is switched individually between diesel operation and gas operation in a switchover range determined, in particular predetermined, by means of switchover operating parameters. The refinement proceeds from the knowledge that switching, in particular in an initial range of an operating cycle of a cylinder, is advantageous; to that extent, individual switching of the entire engine results in the sequential sequence of the initial ranges of the operating cycles of the number of cylinders. In particular, it is possible to switch individually cylinder by cylinder from one operating cycle to the next and at the beginning of a respective operating cycle per cylinder for each bank (in the sequence of ignition).

A switchover range is not necessarily limited to a one-dimensional range or to a single point of a state pressure of the intake path, but rather can have a characteristic map of variable and/or fixed switchover points. A variable and fixed switchover operating parameter is to be understood for example as a SETPOINT value thereof, which can be chosen variably and is then fixedly predefined.

For example, the variable and/or fixed switchover points of the switchover range can be established by variable and/or fixed switchover operating parameters comprising at least one state pressure or advantageously, in particular in order to form a hysteresis region, a state pressure region. Further switchover operating parameters can advantageously be selected from the group of operating parameters including: engine speed, maximum combustion air ratio, fraction of a liquid fuel mass, in particular diesel fuel mass, in the total fuel mass in injection-jet operation, an at least necessary or appropriate state pressure of the intake path in diesel operation, in particular of the receiver pressure in the receiver volume.

In principle, it can be seen that a multiplicity of these switchover operating parameters, in particular the state pressure of the charge mixture, can be measured in the intake path. Within the scope of one refinement, a state pressure can also serve as the basis for a complex state pressure variable; this can for example be a first state pressure in the form of a SETPOINT state pressure and/or a second state pressure in the form of an ACTUAL state pressure.

In particular, a state pressure variable can consist of a combination of the first and second state pressure and may also take into account further state pressures of the intake path or of the intake system, for example a combination of a receiver pressure and a charge pressure (p5 and p3 in the drawing).

In particular, a switchover operating parameter may be based on a difference between the first and second state pressure of the intake path, in particular a difference between a SETPOINT and ACTUAL value of the same state pressure and/or a difference in a state pressure upstream and downstream of a throttle member. For example, the difference in a state pressure upstream and downstream of an engine throttle, in particular receiver pressure and charge pressure (p5 and p3 in the drawing), can be taken into account as first and second state pressure. For example, the difference in a state pressure upstream and downstream of a compressor bypass throttle, in particular intake pressure and charge pressure (p1 and p3 in the drawing) can be taken into account as first and second state pressure. With such or similarly complex state pressure variables, it can be possible to bring about a substantial improvement in control performance of a control system. It also permits a more flexible configuration for a control system, in that for example a difference between the first and second state pressure of a SETPOINT and ACTUAL value defines a hysteresis for the switchover range.

Among other things, and also against this backdrop, it has proven particularly advantageous that the state pressure is determined virtually, for example is simulated and/or calculated. To that end, it is possible to take as a basis a suitable computational model for the charge system, in particular comprising the intake path. It has been shown, within the context of a particularly preferred refinement, that the computational model should comprise at least two computational volumes which make up the largest volume regions of the charge path. This relates in particular to the computational volume of a receiver volume such as for example a manifold on the engine and/or the computational volume of an intercooler. Taking into account this comparatively large volume, it is possible to consider, separately, gas mixture states in a receiver volume and/or intercooler volume which establish dynamically and beyond the static region.

Within the scope of a particularly preferred first variant of a refinement, it has proven advantageous that the first operating state is pure diesel operation with only diesel. In particular, a virtually determined operating parameter of the first operating state can be determined, in a control mode provided for the first operating state, by means of a characteristic map arrangement assigned to pure diesel operation. This relates in particular to a virtually determined state pressure, be that a SETPOINT or ACTUAL state pressure, in particular in the receiver volume (p5). This may also relate to other virtually determined operating parameters such as temperature and expansion volume (e.g. a temperature T5, in the receiver volume V5, assigned to the receiver pressure p5). This may also relate to corresponding variables in the intercooler volume (e.g. a temperature T3, in the intercooler volume V3, assigned to the charge pressure p3).

Within the scope of a particularly preferred second variant of a refinement, the second operating state can be pure gas operation with gas as the fuel. In particular, pure gas operation is also to be understood as ignition jet operation in accordance with the diesel process with external mixing of a gas-air mixture to give a diesel ignition jet. Preferably, it is possible to determine, i.e. simulate and/or calculate, beyond the real operating state, a virtually determined operating parameter of the second operating state. Preferably, the operating parameter is determined, in a control mode provided for the second operating state, by means of a characteristic map arrangement assigned to pure gas operation. In particular, it is possible to determine, for pure gas operation, a gas state of the receiver volume and/or of the intercooler volume (p5, T5, V5 or p3, T3, V3).

The above-mentioned first and/or second variant can make it possible to dispense with the measurement (which may be difficult or impossible and, if possible, unreliable) of an operating parameter, in particular of a state pressure in the intake path, in particular the receiver volume and/or the intercooler volume. It can also be made possible to appropriately determine and use a SETPOINT and/or ACTUAL value of an operating parameter, in particular of a state pressure in addition to or as an alternative to a measured value.

Within the scope of a particularly preferred refinement, it is provided to determine virtually, in particular to calculate and/or to simulate on the basis of the computational model of the intake path, the gas operation and the diesel operation in parallel and/or in real-time alongside the real operation of the dual-fuel internal combustion engine. This has the advantage that, in particular in the switchover range, a foreseeable state of the dual-fuel internal combustion engine, e.g. as SETPOINT value of an operating parameter, in particular of a state pressure, can be made available and compared in parallel and in real-time both in pure diesel operation and in pure gas operation. It is thus possible to advantageously configure a switchover point between gas operation and diesel operation, i.e. from diesel operation to gas operation and/or from gas operation to diesel operation, in particular avoiding excessive emissions and avoiding jumps in torque. However, the concept of the refinement of determining, in parallel and/or in real-time, important state variables of gas operation and of diesel operation, such as at least one state pressure, leads to comparatively good knowledge of the operating states on account of virtual determining and for that reason it is possible to predefine relatively well an advantageous switchover point.

It can in particular be seen that the computational model discussed in the context of an above-mentioned refinement can advantageously be used with a computational volume of the receiver volume and/or of the intercooler in order to permit a reliable prediction of the virtual operating states of a dual-fuel internal combustion engine in pure diesel operation or in pure gas operation.

In particular, it has proven advantageous that the operating state comprises at least one first, in particular virtually determined, operating parameter of the first operating state and/or the second operating state comprises at least one second, in particular virtually determined, operating parameter of the second operating state. In particular, the first and/or second operating parameter is a state pressure of the intake path, in particular a state pressure immediately upstream of a cylinder of the engine, in particular a receiver pressure in the receiver volume of the engine. Advantageously, the first and second operating parameter, in particular the first and second state pressure of the first and second operating state, are made available in parallel and/or in real-time.

Preferably, it is possible with the above-mentioned refinement that switching takes place at a switchover operating parameter of a state pressure of the intake path such that a combustion air ratio (in this case LAMBDA_GAS value) of the gas-air mixture is below a threshold value, e.g. below 2.5, in particular below 2.0. This has the advantage that excessive HC emissions are avoided also in the switchover range.

Exemplary embodiments of the invention will now be described below with reference to the drawings. These are not necessarily intended to represent the exemplary embodiments true to scale, but rather the drawings, where expedient for the purposes of explanation, are schematic and/or slightly distorted. In respect of additions to the teachings which can be directly recognized from the drawing, reference is made to the relevant prior art. In that context, it is to be taken into account that a great many modifications and changes relating to the form and the detail of an embodiment can be undertaken without departing from the general idea of the invention. The features of the invention disclosed in the description, in the drawing and in the claims can be essential for the refinement of the invention, either on their own or also in any combination. In addition, the invention encompasses all combinations of at least two of the features disclosed in the description, the drawing and/or the claims. The general idea of the invention is not restricted to the exact form or the detail of the preferred embodiments shown and described in the following, or restricted to subject matter which would be restricted in comparison to the subject matter claimed in the claims. In the case of cited ranges of dimensions and ratings, values which are within the cited limits are also disclosed as limit values and can be used and claimed as desired.

Further advantages, features and particularities of the invention will emerge from the following description of the preferred embodiments and with reference to the drawing; individually, the drawings show, in:

DETAILED DESCRIPTION OF THE INVENTION

Figure 1:
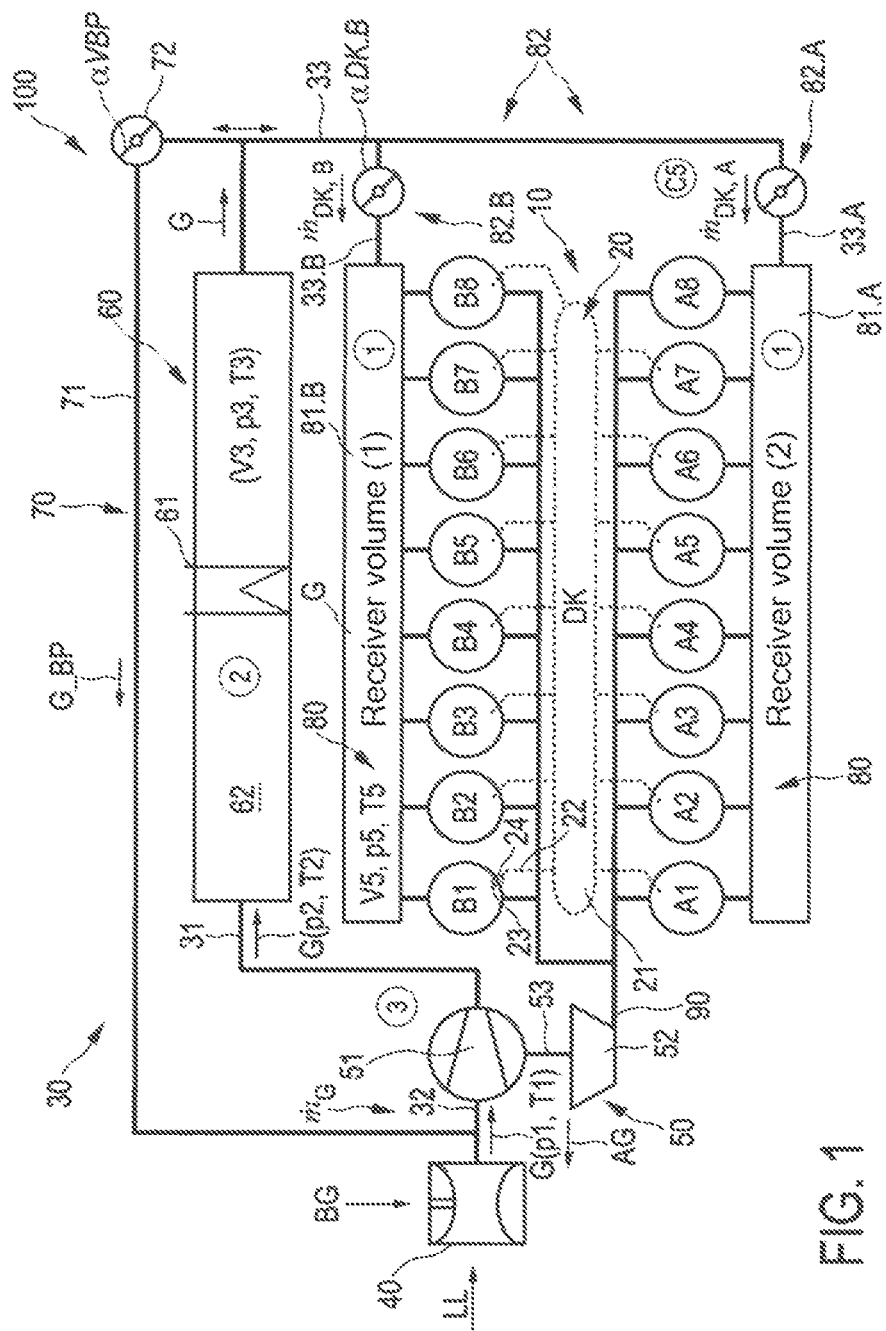
FIG. 1 a map of a dual-fuel internal combustion engine having an intake path with a forced-induction unit in the form of a turbocharger and with an intercooler having an intercooler volume, and having an engine with a number of cylinders and with individual cylinder by cylinder gas metering for combustion gas BG and with a common rail injection system, wherein the cylinders are connected to a receiver volume and wherein the forced-induction unit can be bypassed by means of a bypass path—the dual-fuel internal combustion engine is configured as a gas-diesel internal combustion engine and can be operated, both in pure diesel operation and in mixed operation or in pure gas operation as ignition-jet operation, with injection of an ignition mixture in the form of diesel.

FIG. 1 shows a multi-fuel internal combustion engine, also termed dual-fuel internal combustion engine 100, having an engine 10, an injection system 20 and an intake system with a branched intake path 30. In the intake path there are arranged, inter alia to form a forced-induction unit, a turbocharger 50 and an intercooler 60, in this case in the form of a charge air cooler, and a bypass 70.

In the present case, the engine is embodied with sixteen cylinders, as a V-engine with eight cylinders Ai, i=1 . . . 8 on an A side and eight cylinders Bi, i=1 . . . 8 on a B side; this type of cylinder arrangement and number of cylinders is represented in the present case merely by way of example. In particular for large-engine applications, other suitable engine configurations comprise ten, twelve, twenty, twenty-four or twenty-eight cylinders, or a different number of cylinders. The engine is provided with a gas metering unit 40 for combustion gas BG for each individual cylinder.

In the present case, the injection system 20 is formed as a common rail system with a common rail 21 from which there branch off a number of injection lines 22—each having an injector 23 and an individual reservoir 24 arranged upstream of the injector—for each cylinder Ai, Bi, i=1 . . . 8 of the engine 10. The injection system 20 is designed to meter liquid fuel such as diesel or a different liquefied or liquid fuel, in order to inject the latter in diesel operation as liquid fuel or in gas operation or ignition jet operation as ignition jet, in each case at the beginning of a working cycle of a cylinder Ai, Bi; this at very high injection pressures.

At the inlet-side end of the intake system of the intake path 30, charge air LL is drawn in from the environment. The charge fluid or mixture (in gas operation with central gas admixing via a gas mixer, also termed combustion gas-air mixture)—in the following mixture G for short—with mass throughflow m(')_G and at intake pressure p1 and at intake temperature T1, which essentially corresponds to the ambient temperature, is fed via a compressor path 32 to a compressor 51 of the turbocharger 50 where it is compressed to a compression pressure p2 at a compression temperature T2. The compressor 51 is driven by a turbine 52 and is mounted with the latter on a common charger axis 53; the turbine 52 of the exhaust-gas tract 90 is in turn driven by the exhaust gas AG, leaving the engine 10, in the exhaust-gas tract 90. The mass flow m(')_G of the mixture G, heated to the compression temperature T2 as a consequence of the compression, is fed to a cooling path 31 of the intake path 30 where it is introduced into an intercooler 60 via a cooler structure 61; in the heat exchanger volume 62, represented symbolically here, there takes place an exchange of heat with a coolant in the cooler structure 61, such that the mixture G is cooled. The combustion gas mixture leaves the heat exchanger volume of variable V3 in cooled form, at a charge temperature T3 and a charge pressure p3, in the direction of a charge path 33 for feeding the mixture G to the engine 10.

In an intake path model, the state of the mixture G upstream of the compressor 51 can by comparison be indicated generally by means of the state variables for pressure and temperature, in this case intake temperature T1 and intake pressure p1 upstream of the compressor 51, or as the case may be downstream of the compressor 51 at increased compression pressure p2 and increased compression temperature T2 with the state variables p2, T2 downstream of the compressor 51, and can be described by means of a suitable compressor model; this may be according to a gas state equation such as for an ideal or real gas. As large volumes of the intake path 30 according to the concept of the invention, particular importance is attached to the following components of the heat exchanger 60 and of the receiver 80, such as for example assigned to a manifold and/or a collection path, such that there is assigned to these and to the wider space of the intake path, for modeling the further gas states, a heat exchanger volume V3 or a receiver volume V5 in the intake path model. Accordingly, the combustion gas mixture G in the heat exchanger volume V3 adopts the state variables p3, T3, this as a consequence of the cooling and of an increase in volume with decreasing charge pressure and charge temperature p3, T3.

The state of the mixture G in the bypass 70 is in principle also determined as a function of the state variables p1, T1 at the inlet to, or p3, T3 at the outlet of the bypass 70, or vice versa in the case of recirculation flow through the bypass 90; i.e. a bypass gas mixture G_BP in the bypass path 71 of the bypass 70 establishes itself depending on the prevailing pressure ratios and on the setting of the compressor bypass throttle 72—in this case according to the setting angle αVBP of the compressor bypass flap. The bypass path 71 can in particular serve for re-circulating excess mixture G upstream of the compressor 51, in order to again supply this, re-compressed, to combustion in the cylinders Ai, Bi of the engine 10.

Before the mixture G in the state p3, T3 is fed to the engine 10, it is fed to the receiver 80, changing pressure and temperature—in accordance with the receiver volume V5 to the receiver pressure p5 and the receiver temperature T5—in accordance with a mass flow m(')_DK fed into the receiver volume 81 via the engine throttle 82. In the present case, a first and a second receiver volume 81.B, 81.A is respectively assigned to a B side and to an A side of the engine 10, i.e. these are arranged upstream of the cylinders Ai, Bi and downstream of the first and second charge path 33.B, 33.A of the B side and A side and downstream of the heat exchanger volume 62. The engine throttle 82 is formed in the present case by a first and a second engine throttle flap 82.B, 82.A, each of which is assigned to the first and second receiver volume 81.B, 81.A accordingly, wherein the first and second engine throttle flap 82.B, 82.A can be set independently of one another; in the following, however, they are summarily described under the engine throttle 82. The receiver volume 81 is to be understood as the sum of the first and second receiver volumes 81.A and 81B. In the receiver volume 81, the mixture G adopts the gas states labeled p5 and T5 as a consequence of the increase in volume and as a function of the setting αDK of the engine throttle flaps 82.A, 82.B in the volume V5 of the receiver volume 81; this independence on the B-side or A-side mass throughflow m(')_DK, B or m(')_DK, A depending on the setting of the engine throttle flaps 82.B and 82.A.

The states of the gas mixture G, labeled pi, Ti, i=1,2 or Vj, pj, Tj, j=3,5, are thus essentially determined in the regions as defined by the compressor 51, the heat exchanger volume 62 and the receiver volume 81, or against the limits imposed by the engine throttle 82 and the compressor bypass throttle 72 or the compressor 51.

In the following, the receiver pressure p5 in the receiver volume V5 or the control variables which make up the receiver pressure p5—such as an ACTUAL receiver pressure p5_ACTUAL or a SETPOINT receiver pressure p5_SETPOINT or a simulated receiver pressure p5—can play a central role for determining a switchover range for the dual-fuel internal combustion engine 100; namely on one hand in diesel operation—without admixing of gas BG via the individual cylinder gas metering 40—or on the other hand in gas operation—with admixing of gas BG via the individual cylinder gas metering 40 and an ignition jet via the injection system 20.

Boundary conditions for a simulation of the dual-fuel internal combustion engine and for the online determining of the virtual values of p5 and p3 in diesel operation on one hand and gas operation on the other hand can, furthermore, be, inter alia:

the assumption of a constant combustion profile, i.e. without taking into account any chemical differences between diesel combustion and gas combustion in ignition jet operation, standard engine friction model partially taking into account the effect of engine speed, no feedback of the individual cylinder switchover between the operating modes to the torque profile during switchover. In particular, the final and the above-mentioned points can however be taken into account in a further iteration or approximation step of the model.

It can be seen that the mass flows m(')_G for combustion gas BG and m(')_LL for charge air LL are set by means of the individual cylinder gas metering 40 according to a combustion air ratio LAMBDA_SETPOINT or a stoichiometric air ratio not necessarily with the assumption of static conditions along the intake path; in the case of an individual cylinder gas metering 40, a complex simulation of the intake path can nonetheless be dispensed with—even an intake path model proves to be not absolutely necessary; this is in contrast to a central gas metering by means of a gas mixer. It is in principle equally possible, e.g. for describing the states of charge air, in an intake path model, such as described with reference to FIG. 1, to calculate two large volumes in order to summarize the volume of the intake path, namely the receiver volume 80 and the intercooler volume 62. In the context of the intake path model, the intake path 30 can be modeled on the basis of the filling and emptying method, as is known in principle. The changes of state in the volumes can in the present case be considered quasi-isothermal. This simplifies the system by limiting to conservation of mass in comparison to the adiabatic viewpoint and in particular simplifies simultaneous calculation of the internal combustion engine or of the intake path thereof in real-time. It is however in principle also possible to use an adiabatic or polytropic viewpoint or a targeted transfer of heat in the case of sufficient computation capacity, in order to simulate the changes of state in the intake path.

In addition, it is possible for specific assumptions for devices of the intake path to be converted in the context of additional models, in particular when measurement values for the corresponding device of the intake path 30 are not available. This relates for example to the additional model of a compressor which describes the action of the compressor 51 and the states of the mixture G upstream of the compressor by means of temperature and pressure (G(p1, T1)) and downstream of the compressor (G(p2, T2)).

Figure 2:
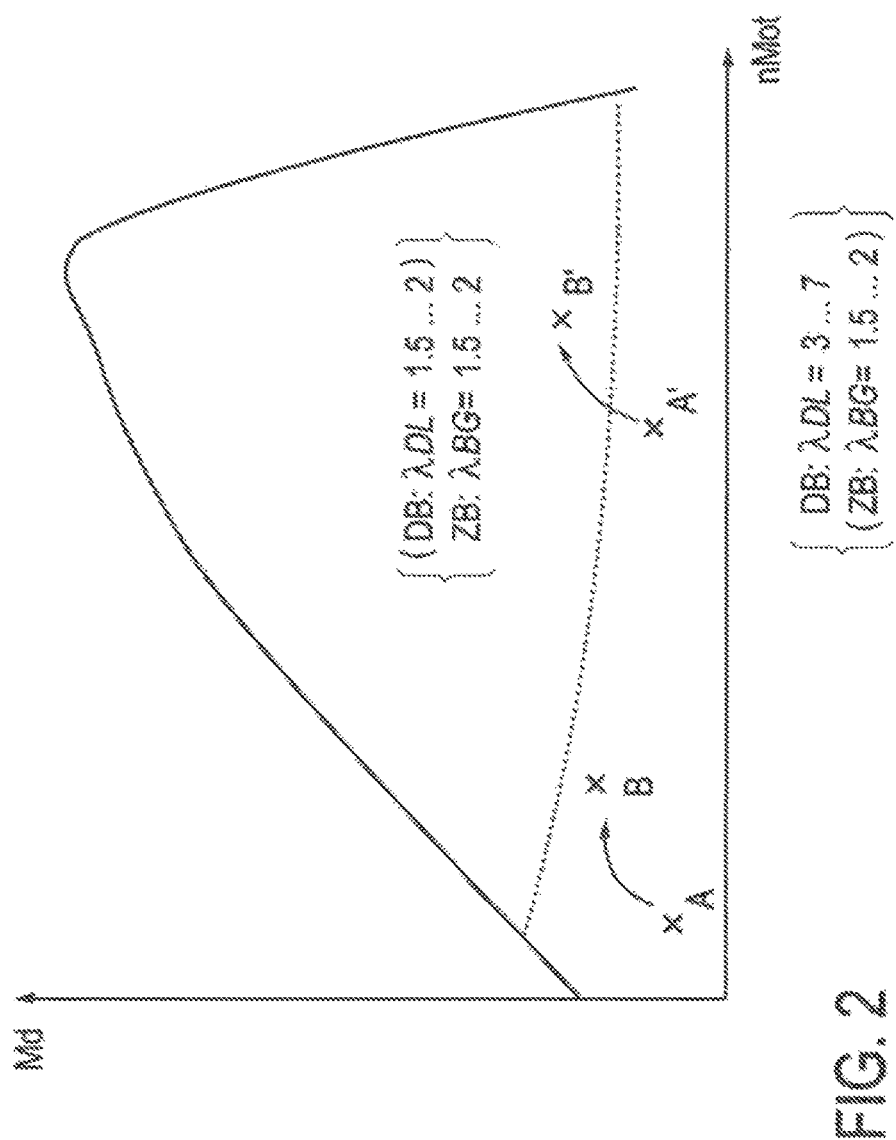
FIG. 2 operating state ranges, plotted by way of example in a diagram for engine speed and engine torque, of diesel operation (DB) and gas operation (ZB), in particular ignition jet operation (ZS), wherein ignition jet operation takes place in the present case for a LAMBDA_GAS value in the range between 1.5 and 2, and diesel operation takes place for a LAMBDA diesel value in the range between 3 and 7; the values in brackets correspond to alternative operating modes (i.e. diesel instead of gas in the upper range and gas instead of diesel in the lower range)

FIG. 2 shows, in a coordinate system relating the engine speed nMOT and the engine torque Md, two different operating ranges, namely one for diesel operation DB and one for ignition jet operation ZB, which are defined by preferred combustion air ratios LAMBDA. For both ranges, the limits are determined by fixing recommended ranges of combustion air ratios, which are in particular determined by exhaust-gas standards. These are indicated by regions of corresponding LAMBDA values LAMBDA_BG (combustion gas) or LAMBDA_DL (diesel). In the preferred diesel operation DB at low load, LAMBDA_DL is preferably between 3 and 7 (LAMBDA_BG between 1.5 and 2). In the present case, these values can advantageously be observed even in the event of changes in load, such as in the transition from operating point A to operating point B or in the transition from operating point A' to operating point B'. In the latter case, it is also necessary to reset the operating mode, namely from diesel operation DB to gas operation ZB, namely generally upon transitioning to a higher load range. In the then preferred ignition jet operation ZB above low load, LAMBDA_BG is preferably between 1.5 and 2, possibly up to 2.5, but not >3 (LAMBDA_DL between 1.5 and 2).

According to the following preferred exemplary embodiment, it is also ensured in the latter case that the emissions—HC emissions, particulate emissions or the like (NOx, CO, CO2)—of the dual-fuel internal combustion machine 100 are comparatively low and in addition it is possible to perform an operating mode transition as far as possible without jumps in torque. A rudimentary solution for a transition between operating points A, B or a transition between operating points A', B' might in principle be, in diesel operation DB—in particular in the low-load range which is generally the case in the start-up range of the internal combustion engine—to meter combustion gas BG into the charge air LL in, as appropriate, very small quantities. These small quantities would be necessary in ignition jet operation ZS because the injected quantity of diesel fuel cannot be reduced as desired and low engine loads require a small supply of fuel. It can be seen however that in the case of such a conversion although it is nonetheless possible, in the limit range, for the LAMBDA value in diesel operation LAMBDA_DL to be lowered somewhat, it still remains relatively large; namely, it is so large that in ignition jet operation ZB there are still air ratios with LAMBDA values in ignition jet operation LAMBDA_BG greater than 2.5 or even greater than 3.0. At such high LAMBDA values, there is still the danger that metered-in combustion gas BG will be discharged again largely un-combusted and cause high emissions values in the exhaust gas AG, in particular high HC emissions. That case also results in bad efficiency eta_ZB of the internal combustion engine in gas operation. It can be seen that although such a procedure is possible in principle, it is however not the primary solution to the problem, stated in the introduction, of an operation transition without change of operating mode and does not provide a solution to the problem of an operation transition between diesel operation DB and ignition jet operation ZB. It can however be seen that, specifically in the case of mobile applications, the operation of dual-fuel internal combustion machines can be sustainable and can be necessary over longer time periods close to a low-load range.

In the case of ignition jet engines, there is a tendency to relatively high HC emissions at low load as a consequence of un-combusted gas, inter alia for the above-mentioned reason of an insufficient control strategy, even in the case of homogeneous air ratios. Combustion air ratios are then generally greater than LAMBDA_ZB=2.5 or even greater than LAMBDA_ZB=3. What is desired however is ignition jet operation with LAMBDA_ZB values below 2.5 but in any case LAMBDA_ZB below 2, preferably in the range between 1.5 and 2.

It is in principle particularly advantageous, within the scope of the present embodiment, that, in ignition jet operation for the switchover principle described here, both combustion gas and diesel can be introduced individually cylinder by cylinder at defined times. Preferably, embodiments derived within this context can in principle also put in practice varied approaches.

A first varied approach for an operating state transition with as far as possible no jump in torque and/or with low emissions can in principle also involve providing the internal combustion engine with an injection system which is designed to realize the ignition-jet method and is furthermore able to realize a continuous injection or multi-point injection (MPI) in any case as an option for a single-point injection (SPI). In other words, it can be provided to provide an individual injector port for each individual cylinder of the engine—that is to say for example directly upstream of an inlet valve of the cylinder for each cylinder individually and/or directly to the cylinder space.

In addition or as an alternative, in a second varied approach, it is possible to perform, for each individual cylinder in each case with a beginning of a working cycle or for a subgroup of cylinders and for this subgroup then in each case in an initial range of a working cycle, a fuel injection to form an ignition jet, for example a diesel injection or other liquid fuel injection. In principle, it is also possible for a certain number of the cylinders—for example in each case two cylinders A1, A2 or A3, A4 or A5, A6 or A7, A8—to be grouped in a subgroup and for an injection to be provided for in each case one subgroup instead of for individual cylinders.

It is in particular possible, in addition or alternatively, in a third varied approach, for an ignition jet injection to be performed sequentially for all of the cylinders, i.e. for a sequence of injections to take place one after the other in time for a number of cylinders individually in sequence or for a number of cylinder groups in sequence. Preferably, the sequence of injections is carried out such that there is an injection for each cylinder, in each case at the beginning or in an initial range of a working cycle. This procedure leads to improved control of the LAMBDA value over a combustion cycle of the engine as a whole or of an individual working cycle of the respective cylinder. It is in principle possible, in addition or alternatively, for multiple injections to be performed per cylinder.

In particular, such a procedure—or a similar procedure—can be advantageous in comparison to simultaneous injection for all the cylinders or in comparison to central injection at a manifold for all the cylinders. Multiple injection, in particular as direct injection into the cylinder space, proves to be expedient in combination with the common rail system, represented in FIG. 1, of an injection system 10. Furthermore, sequential multi-point injections as direct injection into the cylinder space have proven to be of great use in the context of a dual-fuel internal combustion machine according to the present embodiment.

It has furthermore been recognized that an increase in a diesel fraction, for example in the case of an operating state transition between A, B and above all in the case of an operating state transition between A', B', is not always advantageous within the scope of the concept of a dual-fuel internal combustion engine; according to a fundamental assumption of the concept, a dual-fuel internal combustion machine should be primarily load-covering in ignition jet operation, rather than in diesel operation. In other words, a fraction of diesel fuel DL should be kept relatively low, in favor of combustion gas consumption. It should in principle be possible to achieve this with operating states assigned principally to the low-load range; that is to say in particular operating states which can lead out of diesel operation but are close to the latter, as is the case for operating states B, B' in FIG. 2.

In a further, also fundamental approach according to the concept, it is provided to throttle the engine of the dual-fuel internal combustion engine in the case of an operating state transition which is close to a switchover range. Preferably, to that end, a throttle member in an intake path 30, in particular in this case an engine throttle 82 in a charge path 33, in particular a first and/or second engine throttle flap 82.A, 82.B in a first and/or second charge path 33.A, 33.B, is moved in the direction of a closed position.

Figure 3:
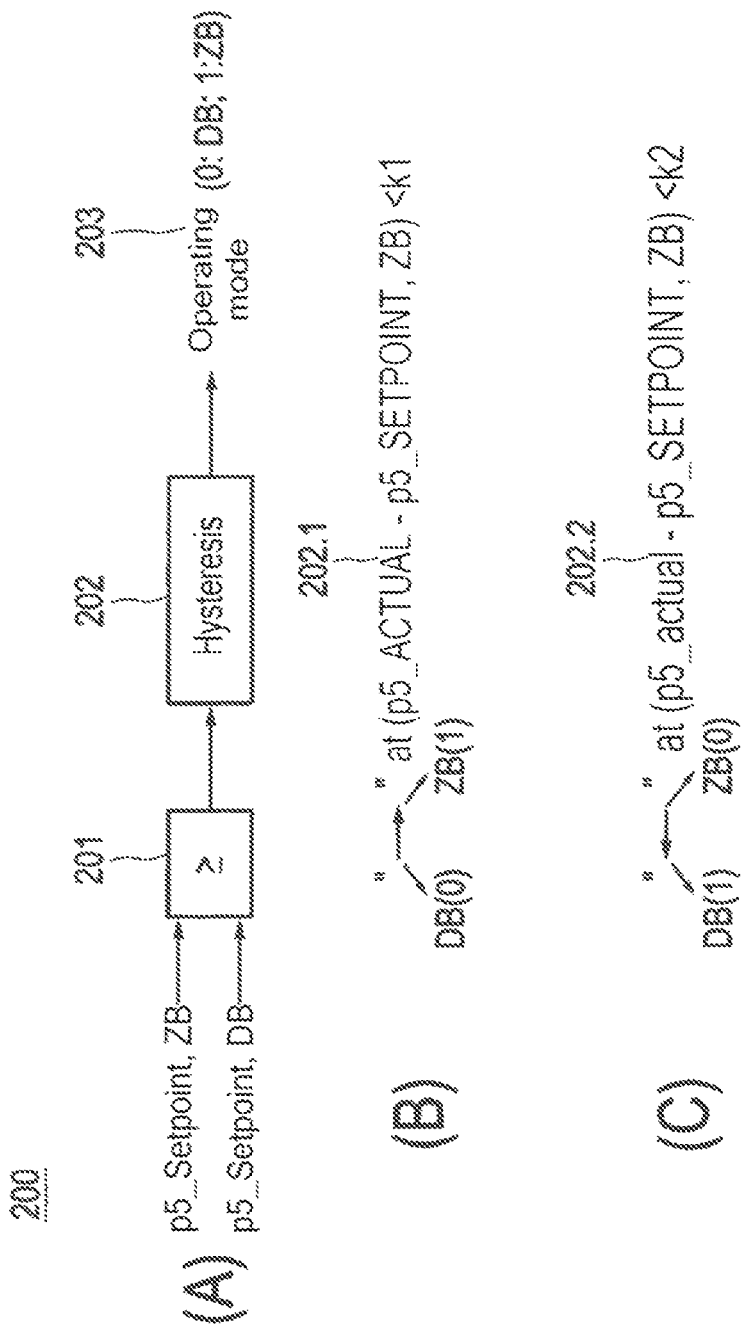
FIG. 3 in view (A) a schematized condition enquiry which can be carried out within a module 200 for a control system at the transition between diesel operation and gas operation, in particular ignition jet operation, (DB, ZB)=(0,1), wherein it proves advantageous to throttle the diesel operation in order to then initiate a switchover procedure, and in view (B) a preferred condition for the transition from gas operation, in particular ignition-jet operation, to diesel operation is shown, and in view (C) a general condition for hysteresis is shown, which also advantageously holds for the transition from gas operation, in particular ignition-jet operation, to diesel operation.

This leads, as is represented schematically in FIG. 3A for the control module 200, particularly advantageously to a reduction in the receiver pressure p5_ACTUAL,DB in the receiver volume 81, in this case specifically the first and/or second receiver volume 81.B, 81.A, during diesel operation. This advantageously reduces the actual receiver pressure p5_ACTUAL,DB to a value at or below a receiver pressure p5_SETPOINT,ZB, in the receiver volume 81 of the intake path, which is advantageous for ignition jet operation. A minimum condition that must be satisfied however is that a desired or minimum receiver pressure p5_SETPOINT,DB or p5_MIN,DB should be below a receiver pressure p5_SETPOINT,ZB which is advantageous for ignition jet operation.

If this condition 201 in the control module 200 is satisfied, it is then possible to check a hysteresis condition 202, represented in FIG. 3A, and for switchover to occur in step 203.

Specifically, a hysteresis condition 202 can be carried out as hysteresis condition 202.1 of FIG. 3B for a switchover procedure from diesel operation DB to ignition-jet operation ZB, or as hysteresis condition 202.1 of FIG. 3C from ignition jet operation ZB to diesel operation DB. The hysteresis condition 202.1 indicates an acceptable threshold value range k1 for which the actual receiver pressure p5_ACTUAL is below the SETPOINT pressure of a receiver pressure p5_SETPOINT,ZB, advantageous for ignition jet operation, in the receiver volume 81. The hysteresis condition 202.2 indicates an acceptable threshold value range k2 for which the actual receiver pressure p5_ACTUAL is below the SETPOINT pressure of a receiver pressure p5_SETPOINT,ZB, advantageous for diesel operation, in the receiver volume 81.

If the difference between the ACTUAL value of p5_ACTUAL and the SETPOINT value of p5_SETPOINT in the receiver volume 81 is below a threshold value k1 or k2, it is possible for the switchover to be performed individually cylinder by cylinder. It is thus possible, when the hysteresis condition 202.1 is satisfied, for the gas nozzles to be activated individually cylinder by cylinder and in addition only the predefined ignition-jet quantities to be injected. Step 203 of the controller module 200 thus brings about switchover of the operating mode from diesel operation DB (0) to ignition jet operation ZB (1).

Conversely, when the hysteresis condition 202.2 is satisfied, the gas nozzles are deactivated individually cylinder by cylinder and the dual-fuel internal combustion engine 100 is operated in diesel operation. Step 203 of the controller module 200 can thus bring about a return to diesel operation DB (1) from ignition jet operation ZB (0) if the hysteresis condition 202.2 is satisfied, namely for the event that the receiver pressure p5 in the receiver volume 81 in ignition jet operation ZB is at or close to a receiver pressure p5 in the receiver volume 81 which is advantageous for diesel operation DB; that is to say, as explained, the difference between p5_ACTUAL and p5_SETPOINT,DB is below a threshold value k2.

Figure 4:
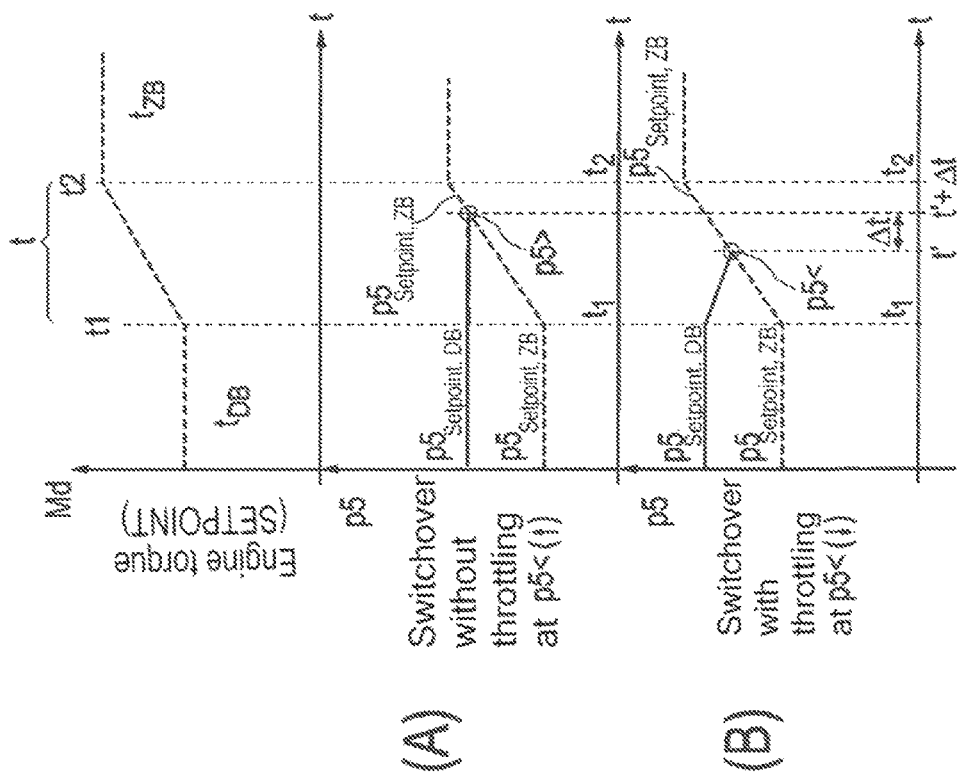
FIG. 4 above, a transient profile of an engine torque Md_SETPOINT as SETPOINT value over time and the associated receiver pressure p5 in diesel operation (DB) for the receiver volume 81, in view (A) without engine throttling, and in view (B) with engine throttling in the transition range t of the engine torque; it can be seen that the load transition with the lowering of the receiver pressure takes place earlier with engine throttling than without engine throttling.

FIG. 4 shows a time-dependent profile of an additional throttling of the engine 10, preferably with the engine throttle 82, in particular the first and/or second engine throttle flap 82.A, 82.B when initiating a transition from diesel operation DB to ignition jet operation ZB. FIG. 4 shows, at the top, the engine torque Md_SETPOINT as a SETPOINT value for times t_DB in diesel operation DB and for times t_ZB in ignition jet operation; in the transition range of a time interval t between time points t1 and t2, the profile follows an incline with increasing engine torque Md.

To that end, FIG. 4A shows the increasing receiver pressure p5_SETPOINT,ZB in the receiver volume 81 for ignition jet operation and as SETPOINT value p5_SETPOINT,DB (also possible in principle ACTUAL value p5_ACTUAL,DB) for diesel operation during the time interval t of the switchover time space between time points t1 and t2, wherein the latter represents a variable which is essentially constant over the time t; fundamentally advantageously, at a predetermined p5_SETPOINT,DB there takes place a switchover from diesel operation DB to ignition-jet operation ZS (generally gas operation ZB), but only at a relatively high receiver pressure p5> and at a relatively late time point t'+Δt. If, by contrast, the receiver pressure p5_ACTUAL,DB in the receiver volume 81 is lowered by throttling—in this case for example by imposing a lowered SETPOINT value p5_SETPOINT,DB—an ACTUAL value of p5 falls over time; this can lead to a switchover to ignition jet operation at a relatively early time point t' and at an already relatively low receiver pressure p5<. The range of the ignition jet operation ZB as represented in FIG. 2 is thus extended over the characteristic map region as it was without throttling.

It can be seen that a receiver pressure p5_ACTUAL in the receiver volume 81 can be lowered, in particular p5_ACTUAL can be lowered to below p5_SETPOINT,ZB as threshold value or below p5_SETPOINT,DB, depending on whether in the first case operation is to be switched to ignition jet operation ZB or, in the second case, to diesel operation DB. In a particularly preferred manner, p5 is used as a switchover operating parameter, in order to keep LAMBDA_SETPOINT,ZB values of the gas, i.e. in gas operation ZB, or LAMBDA_SETPOINT,DB values in diesel operation DB in preferred ranges even during switchover procedures.

Figure 6:
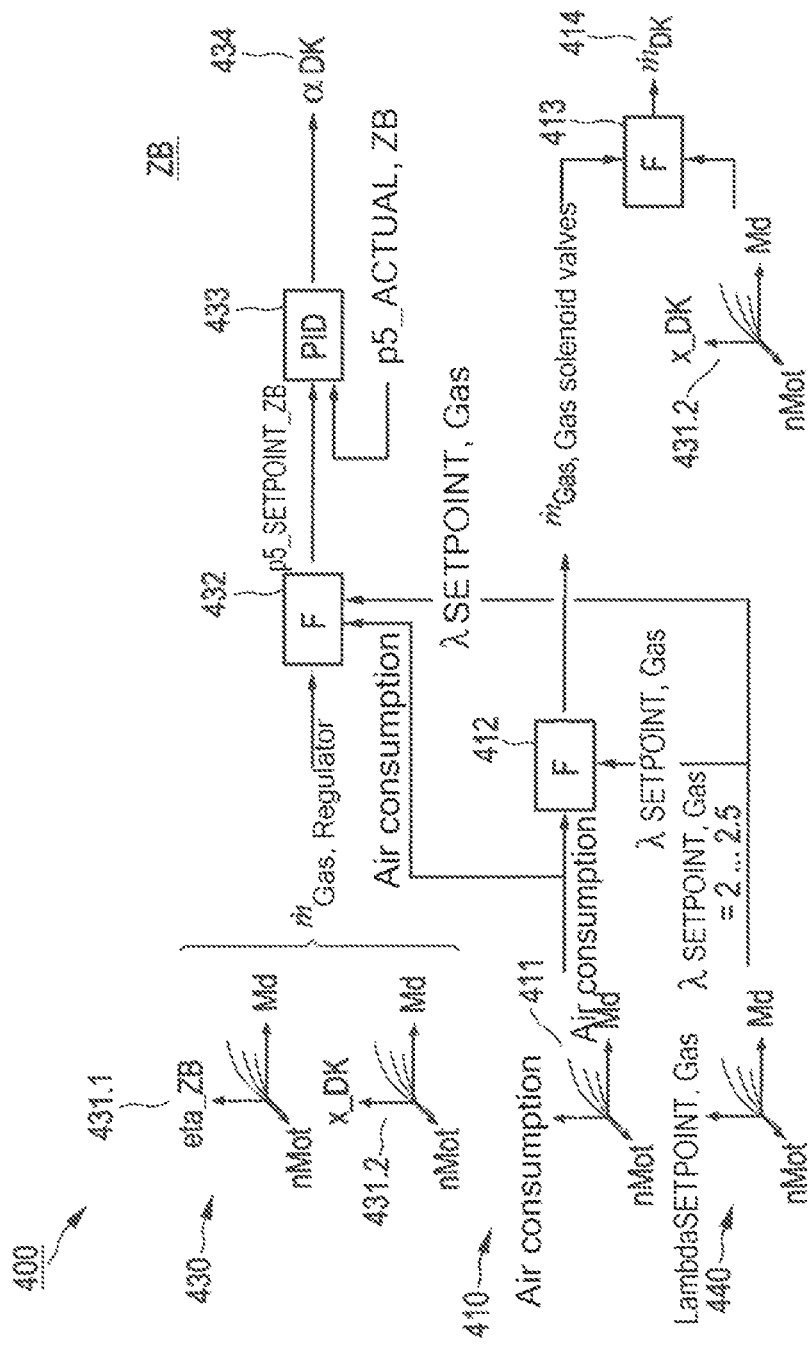
FIG. 6 a schematic representation of a structure for a controller part 400 of a controller for gas operation, in particular ignition-jet operation.

The influence of LAMBDA_SETPOINT,ZB on p5_SETPOINT,ZB is explained in detail proceeding from FIG. 2 with respect to gas operation, with reference to the controller structure of FIG. 6.

Figure 5:
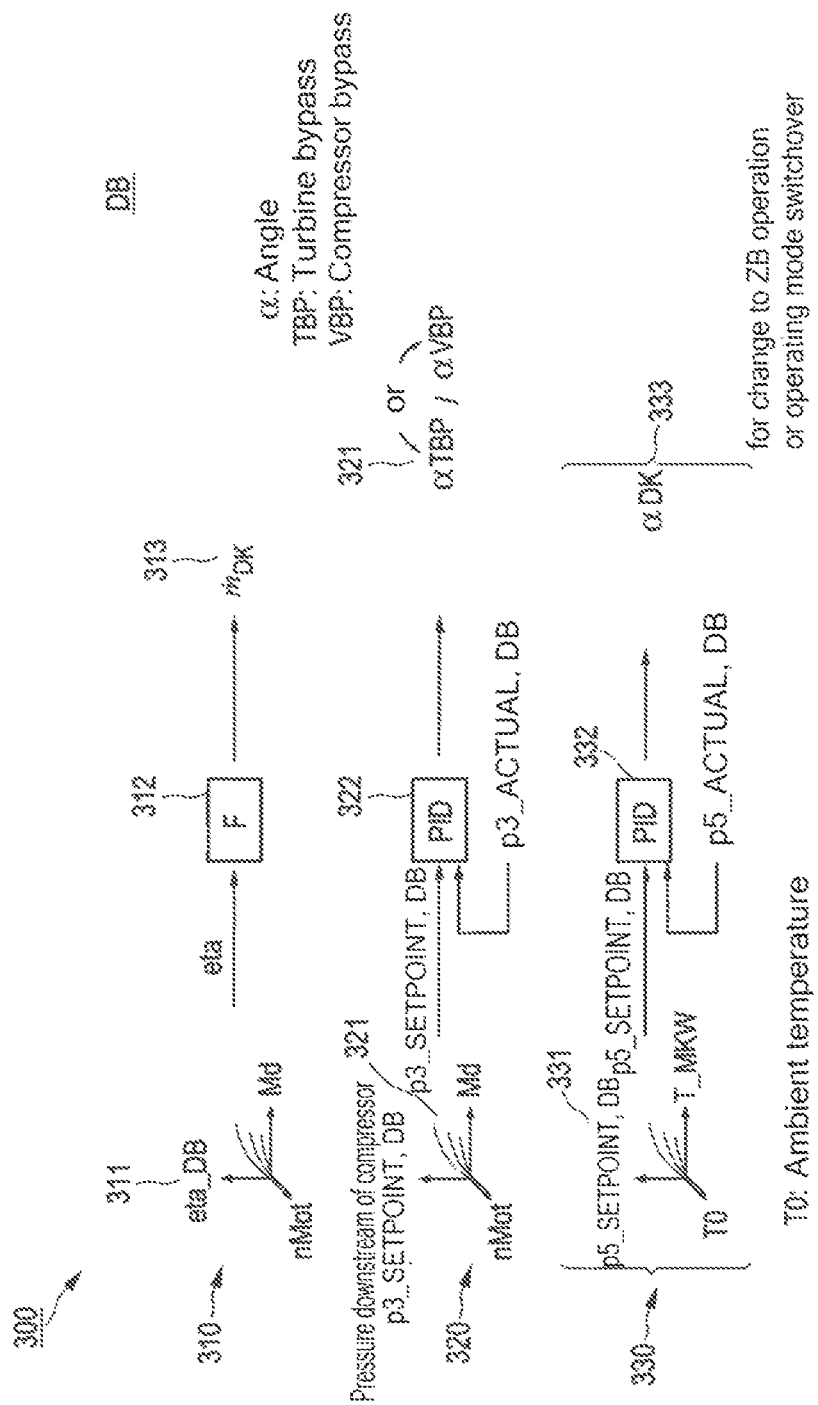
FIG. 5 a schematic representation of a structure for a controller part 300 of a controller for diesel operation.

First, it is explained in simple terms with reference to FIG. 5 how a control module for performing a throttling procedure in the case of a throttle member in the intake path 30 proceeding from diesel operation DB can take place. FIG. 5 shows, schematically, the structure of a control module 300 for the first operating state of diesel operation DB. The control module 300 has, in essence, a first control path or control unit 310 for controlling a diesel injection mass m(')_DB in diesel operation. A second control path or control unit 320 is designed for controlling an adjustment angle of a compressor bypass throttle 72 and/or of a turbine bypass throttle, in this case in particular with corresponding setting angles αTBP or αVBP of throttle flaps. A third control path or control unit 330 is designed for controlling a setting angle αDK of an engine throttle flap DK; the latter serves in particular for realizing a throttling during initiation of a switchover from diesel operation DB to gas operation ZB as shown in FIG. 4B.

The control unit for representing the first control path 310 in the control module 300 for diesel operation DB makes use of a characteristic map 311, plotted against engine speed nMOT and engine torque Md, for an efficiency eta_DB in diesel operation. The characteristic map 311 shows, depending on the operating state of the engine and the load demand, the efficiency eta_DB and this determines, via a functional dependency 312, the fuel mass m(')_DB to be injected, which is here labeled 313.

The control unit for representing the second control path 320 in the control module 300 for diesel operation makes use of a characteristic map 321 for the charge pressure p3 in the heat exchanger volume 62, or generally for a state pressure downstream of the compressor 51 which is predefined in diesel operation DB as SETPOINT value p3_SETPOINT, DB. This characteristic map 321 in turn shows, depending on the engine operating state and the load demand, a SETPOINT value of the charge pressure p3 downstream of the compressor 51, or in or downstream of the heat exchanger volume V3, i.e. in particular upstream of the engine throttle 82, i.e. still in the charge path 33. Comparing the SETPOINT value p3_SETPOINT,DB with an ACTUAL value p3_ACTUAL,DB at a PID controller 322 for controlling the charge pressure p3 delivers, as setting variable, a setting angle α for a compressor bypass VBP and/or a turbine bypass TBP, for example a setting angle αVBP for the compressor bypass throttle 72, in this case in the form of the compressor bypass flap or (not shown) a setting angle αTBP for the turbine 52, which can be represented by means of a turbine bypass path and/or by means of a variable turbine geometry.

The control unit for representing the third control path 330 in the control module 300 for diesel operation comprises a characteristic map 331 which in the present case is provided specifically for the low-omission and jump-free realization of an operating from diesel operation to ignition jet operation. Specifically, the third control path 330 supports a realization of an operating state change between A', B' as is shown in FIG. 2. To that end, the characteristic map 331 shows the indication of a receiver pressure p5 in a receiver volume 81 as SETPOINT value in diesel operation p5_SETPOINT,DB in dependence on an ambient temperature T0 and a temperature of the engine cooling water T_MKW. Alternatively, it would for example also be possible to plot against charge air temperature T5 and T_MKW. Comparing a SETPOINT and ACTUAL value of p5 in a PID controller 332 delivers a setting variable for setting the setting angle αDK of the engine throttle 82, which in this case is labeled 333. As a result, as the waste heat power of the engine, as compared to the ambient temperature, increases, the engine throttle 82 can be moved in the direction of a closed position in order to throttle the engine 10 and thus prepare a substantially jump-free transition to gas operation ZB. This leads to the behavior, shown in FIG. 4B, of the cylinder inlet pressure or of the pressure p5 in the receiver volume and thus to a relatively early switchover to ignition jet operation ZB (gas operation). Together with the hysteresis condition 202 described with reference to FIG. 3A, and measures for engine throttling according to the control unit of the third control path 330, a low-emissions and jump-free operating mode switchover is made possible.

FIG. 6 shows a control module 400 for realizing a control system for gas operation, in particular ignition jet operation ZB. This provides for at least one control path 430 and a further control path 420 represented in FIG. 7. An auxiliary control path 410 and a further auxiliary control path 440 are coupled to the control path 430 in order to influence the functional dependency 432.

With reference first of all to the first control path 430 realized by means of a control unit, the latter makes use of a first characteristic map 431.1 and of a second characteristic map 431.2, wherein the first characteristic map produces an efficiency eta_ZB in ignition jet operation as a function of engine speed nMOT and engine torque Md. The second characteristic map 431.2 also delivers, as a function of engine speed nMOT and engine torque Md, a gas and/or diesel quantity control indication x_DL. Both characteristic maps 431.1 and 431.2 deliver as a result, via a functional dependency, a quantity throughflow of gas to the individual cylinder injection, upstream of the cylinder. Via a functional dependency 412, a receiver pressure p5 in the receiver volume 81 can be determined as a SETPOINT value in ignition jet operation ZB, i.e. p5_SETPOINT,ZB. Comparing with the corresponding ACTUAL value p5_ACTUAL,ZB makes it possible to output, at a PID controller 413, a setting variable as setting angle of the throttle flap αDK, here labeled 434.

The functional dependency 412 of the control path 410 is influenced by the air consumption set down as a function of the engine speed nMOT and the receiver pressure p5 in the receiver volume 81.

The air consumption is defined in the auxiliary control path 410 as the actual mass throughflow of charge air compared to a theoretical charge air value. The air consumption is obtained from the characteristic map 411 from the receiver pressure p5 and a certain engine speed nMOT. With the exception of a mass throughflow of gas, which can be set at the individual cylinder gas metering valves 40, the air consumption is thus input into the functional dependency 432 for determining the SETPOINT value of the receiver pressure p5 in the receiver volume 81.

Furthermore, a further auxiliary control path 440 predefines a LAMBDA_SETPOINT,ZB gas value as a function of an engine speed nMOT and of an engine torque Md by means of a characteristic map 441. Moreover, the LAMBDA_SETPOINT,ZB gas value results as a value below 2.5, in particular below 2. This is also fed to the control unit for representing the functional dependency 432. As a result, the air consumption from the characteristic map 411 and LAMBDA_SETPOINT,ZB from the characteristic map 441 are then applied to the input interfaces of the control unit of the functional dependency 432, such that the functional dependency 432 determines therefrom a SETPOINT value for the receiver pressure p5_SETPOINT,ZB in the receiver volume 81.

In the auxiliary control path 410, there are furthermore applied, to the computation unit for representing a further functional dependency 412, once again the air consumption and also the gas value LAMBDA_SETPOINT,ZB from the characteristic map 441. Determined therefrom, as output value, is the mass throughflow of gas for the gas solenoid valves. A further functional unit 413 calculates the fuel mass to be injected, with reference to the second characteristic map 431.2; this is provided here, as m(')_DB, with the label 414.

Figure 7:
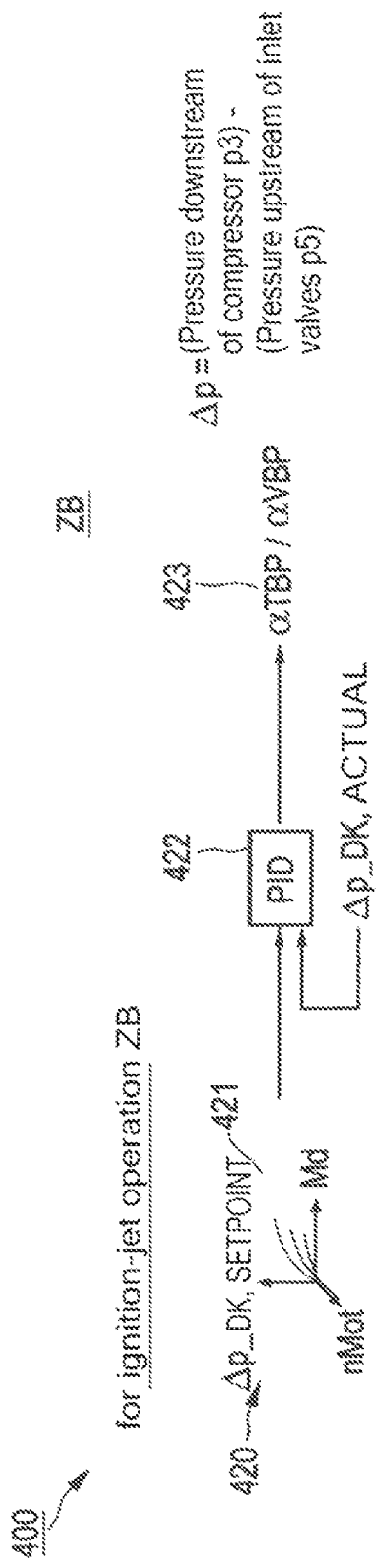
FIG. 7 a module 420 for the controller part 400 of a controller for gas operation, in particular ignition-jet operation, (A) and possibilities for a control structure for a transition from gas operation, in particular ignition-jet operation, to diesel operation for converting a throttling procedure by means of compressor bypass and/or turbine bypass (VBP, TBP) and corresponding bypass flap setting αVBP or throttle flap setting αDK.

With reference to FIG. 7, in this case the equivalent of the second control path 320 for diesel operation DB is shown as a further control path 420 in ignition jet operation ZB, namely the further control path 420 for representing an adjustment angle α of a turbine bypass TBP and/or of a compressor bypass VBP. In this case, it is based on a characteristic map of a pressure differential Δp_SETPOINT,DK at the throttle flap as SETPOINT value, plotted against the engine speed nMOT and the engine torque Md. The pressure differential Δp_SETPOINT,DK is obtained as a pressure downstream of the compressor 51, which is termed here as charge pressure p3, minus the pressure upstream of the inlet valve, which is here termed as receiver pressure p5 in the receiver volume 81; i.e. Δp=p3-p5. The SETPOINT value of Δp is to be understood as the difference between the SETPOINT value of the charge pressure and of the receiver pressure p5.

By comparing a SETPOINT value and an ACTUAL value Δp_ACTUAL,DK of the pressure differential, by means of a control unit in the form of a PID controller 422, it is possible to determine the setting variable αVBP or αTBP, which is labeled here as 423.

The invention claimed is:

1. A method for operating a dual-fuel internal combustion engine having an intake path and an engine having a number of cylinders, the method comprising the steps of:
    operating the engine in a first operating state in diesel operation with diesel or another liquid fuel, and in a second operating state in gas operation with gas as fuel in a charge mixture; and
    switching between diesel operation and gas operation in a switchover range determined by switchover operating parameters, wherein
    a first state pressure is a SETPOINT pressure and/or a second state pressure is an ACTUAL pressure, wherein a combination thereof, in particular a difference between the SETPOINT pressure and the ACTUAL pressure, is used as input for a control loop which sets a throttle.

2. The method as claimed in claim 1, wherein at least one of the switchover operating parameters is a state pressure of the charge mixture in the intake path upstream of a cylinder of the engine.

3. The method as claimed in claim 2, wherein the at least one of the switchover operating parameters is a SETPOINT value of a state pressure of the charge mixture.

4. The method as claimed in claim 3, wherein the SETPOINT value is a minimum value of the state pressure.

5. The method as claimed in claim 2, wherein the state pressure is a charge pressure and/or a receiver pressure upstream of a cylinder of the engine.

6. The method as claimed in claim 5, wherein the state pressure is a minimum value of the receiver pressure, is assigned to a receiver volume upstream of the cylinders of the engine, wherein the receiver volume is arranged upstream of the cylinders and is arranged downstream of a forced-induction unit and/or of a bypass.

7. The method as claimed in claim 5, wherein the receiver pressure and/or of the charge pressure is measured.

8. The method as claimed in claim 2, wherein the state pressure is determined virtually based on a computational model of the intake path, comprising at least volumes, which are assigned to a receiver and/or to an intercooler.

9. The method as claimed in claim 1, wherein in gas operation the engine is operated in accordance with a diesel process with external mixing of a gas-air mixture as charge mixture and, in diesel operation, is operated with charge air as charge mixture.

10. The method as claimed in claim 1, wherein each cylinder of the engine is switched individually between diesel operation and gas operation in a switchover range determined by the switchover operating parameters in each case in an initial range of an operating cycle of the respective cylinder.

11. The method as claimed in claim 10, wherein the switchover range is fixed in a characteristic diagram of variably fixed switchover operating parameters.

12. The method as claimed in claim 11, wherein the switchover range is fixed by variably fixed state pressures of the charge mixture in the intake path upstream of a cylinder of the engine.

13. The method as claimed in claim 1, wherein further switchover operating parameters are chosen from the group of operating parameters including: engine speed, maximum combustion air ratio, fraction of mass of the diesel fuel in a total mass of the fuel in gas operation.

14. The method as claimed in claim 1, wherein a current value of the switchover operating parameter is measured.

15. The method as claimed in claim 1, wherein the first operating state is determined as diesel operation with diesel wherein a determined operating parameter of the first operating state is calculated in a control mode provided for the first operating state by a characteristic diagram arrangement assigned to the diesel operation.

16. The method as claimed in claim 1, wherein the second operating state is determined as gas operation with gas as fuel, the second operating state being ignition-jet operation in accordance with a diesel, process with external mixing of a gas-air mixture and a diesel ignition jet, wherein a determined operating parameter of the second operating state is calculated in a control mode provided for the second operating state by a characteristic diagram arrangement assigned to the gas operation.

17. The method as claimed in claim 1, wherein
the first operating state comprises at least one first virtually determined operating parameter of the first operating state and/or
the second operating state comprises at least one second virtually determined operating parameter of the second operating state, wherein
the first and second operating parameters of the first and second operating states are indicated simultaneously and/or in real-time.

18. The method as claimed in claim 1, wherein switchover takes place at a switchover operating parameter of a charge pressure and/or receiver pressure of the intake path, with the condition that a LAMBDA value of gas operation is below 2.5.

19. The method as claimed in claim 18, wherein the condition is that the LAMBDA value is below 2.

20. The method as claimed in claim 1, wherein a switchover operating parameter at a first switchover point from diesel operation to gas operation is different than a switchover operating parameter at a second switchover point from gas operation to diesel operation.

21. The method as claimed in claim 1, wherein a first switchover point from diesel operation to gas operation takes place with throttled engine and/or with throttled intake path.

22. The method as claimed in claim 1, wherein switching between diesel operation and gas operation takes place at a charge pressure and/or receiver pressure, with the condition that the state pressure of diesel operation is at most equal to the state pressure of gas operation.

23. The method as claimed in claim 1, wherein switching takes place at a switchover point of the switchover operating parameter of a charge pressure and/or receiver pressure, with a condition that the charge pressure and/or receiver pressure is within a hysteresis range.

* * * * *